United States Patent [19]

Oppenlaender et al.

[11] Patent Number: 5,064,552
[45] Date of Patent: Nov. 12, 1991

[54] NITRITE- AND PHOSPHATE-FREE ANTIFREEZE BASED ON GLYCOL

[75] Inventors: Knut Oppenlaender, Ludwigshafen; Juergen Mohr, Gruenstadt; Gert Liebold, Edingen-Neckarhausen; Guenter Frey, Dannstadt-Schauernheim, all of Fed. Rep. of Germany

[73] Assignee: BASF Aktiengesellschaft, Ludwigshafen, Fed. Rep. of Germany

[21] Appl. No.: 660,267

[22] Filed: Feb. 26, 1991

Related U.S. Application Data

[63] Continuation of Ser. No. 409,344, Sep. 19, 1989, abandoned.

[30] Foreign Application Priority Data

Sep. 24, 1988 [DE] Fed. Rep. of Germany ....... 3832592

[51] Int. Cl.$^5$ ................................................. C09K 5/00
[52] U.S. Cl. .................................... 252/78.3; 252/75; 252/76; 252/79; 252/71
[58] Field of Search ................... 252/75, 76, 79, 78.3, 252/33.4, 33.6, 71

[56] References Cited

U.S. PATENT DOCUMENTS

| | | | |
|---|---|---|---|
| 3,634,240 | 1/1972 | O'Halloran | 252/33.6 |
| 3,966,620 | 6/1976 | Bridger et al. | 252/33.4 |
| 4,455,248 | 6/1984 | Wood | 252/75 |
| 4,629,602 | 12/1986 | Gousetis et al. | 252/75 |
| 4,647,392 | 3/1987 | Darden et al. | 252/76 |
| 4,759,864 | 7/1988 | Van Neste et al. | 252/75 |
| 4,810,404 | 3/1989 | Gousetis et al. | 252/75 |

FOREIGN PATENT DOCUMENTS

| | | |
|---|---|---|
| 0283806 | 3/1988 | European Pat. Off. . |
| 1745923 | 12/1961 | Fed. Rep. of Germany . |
| 1154976 | 9/1963 | Fed. Rep. of Germany . |
| 2943963 | 5/1981 | Fed. Rep. of Germany . |
| 3440194 | 5/1986 | Fed. Rep. of Germany . |
| 205183 | 10/1987 | Japan . |

OTHER PUBLICATIONS

Kirth–Othmer Encyclopedia of Chemical Technology, Third Edition, vol. 3, pp. 79–95.
Kirth–Othmer Encyclopedia of Chemical Technology, Third Edition, vol. 20, p. 864.
Ullmanns Encyklopadie der technischen Chemie, 3rd Ed., vol. 20, p. 864.

*Primary Examiner*—Prince E. Willis
*Assistant Examiner*—J. Silbermann
*Attorney, Agent, or Firm*—Keil & Weinkauf

[57] ABSTRACT

A glycol-based antifreeze mixture which is free of nitrites and phosphates contains an alkali metal salt of a $C_4$–$C_{16}$-alkenylsuccinic acid, stabilized silicate and further corrosion-inhibiting additives.

3 Claims, No Drawings

NITRITE- AND PHOSPHATE-FREE ANTIFREEZE BASED ON GLYCOL

This application is a continuation of application Ser. No. 409,344, filed on Sept. 19, 1989, now abandoned.

The present invention relates to a nitrite- and phosphate-free antifreeze mixture based on glycol and containing an alkali metal salt of a $C_4$–$C_{16}$-alkenylsuccinic acid, a silicate and a silicate stabilizer.

Modern antifreezes for internal combustion engines usually contain glycols (ethylene glycol or propylene glycol) as main component. In the cooling system, they are diluted with water and are intended to provide not only frost protection but also efficient heat dissipation. However, glycol/water mixtures are very corrosive at the high operating temperatures of internal combustion engines, and for this reason the various metals and alloys encountered in the automotive cooling system must be adequately protected from corrosion.

This task is performed by various additives present as corrosion inhibitors in antifreezes, for example alkali metal nitrates, alkali metal nitrites, alkali metal silicates, benzoates, alkanolamines, phosphates, triazoles, and others, alongside sodium hydroxide or calcium hydroxide and alkali metal borates which ensure an adequate alkali reserve for the neutralization of acidic oxidation products.

Such antifreeze mixtures are common knowledge and are described for example in Ullmann Enzyklopädie der technischen Chemie, 4th edition, volume 12, pages 205 et seq., and also in Kirk-Othmer Encyclopedia of Chemical Technology, 3rd edition, 1978, volume 3, pages 79 et seq.

Nitrites are some of the most effective corrosion inhibitors on iron, but they may react with primary and secondary amines to form highly toxic nitrosamines. This may happen in particular when different grades of antifreeze are mixed, which can be for example the case on topping up the radiator.

Problems may also be incurred from the use of phosphates, which besides iron can also protect aluminum through formation of cover layers, when the added water is very hard. The alkaline earth metal phosphates which precipitate can lead to problems as a result for example of poor heat dissipation, erosion or even radiator blockages.

It is an object of the present invention to provide an antifreeze which is amine-, nitrite- and phosphate-free but which nonetheless provides adequate protection for metallic materials in the cooling system.

DE-Al-3,440,194 discloses cooling fluids which contain organosilane and silicate copolymers for corrosion stabilization. However, the antifreeze mixtures described therein require sodium nitrite, which has the abovementioned disadvantages.

DE-C2-2,943,963 discloses the use of alkanolamine salts of $C_8$- and $C_9$-alkenylsuccinic acids as water-soluble corrosion inhibitors. For the abovementioned reasons, however, the use of amine salts in antifreeze mixtures is problematical and expressly undesirable in practice.

We have found, surprisingly, that the above-mentioned object is achieved by a highly effective corrosion-inhibiting yet phosphate- and nitrite-free antifreeze formulation which contains, besides ethylene glycol and/or propylene glycol and water, a) 1–5% by weight of an alkali metal salt of a $C_4$–$C_{16}$-alkenylsuccinic acid, b) 0.1–1% by weight of a silicate of the general formula II

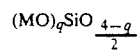

$$(MO)_q SiO_{\frac{4-q}{2}} \quad (II)$$

where
M is an alkali metal and
q is from 0.4 to 4, c) 0.01–0.2% by weight of a silicate stabilizer, d) 0–0.5% by weight of an alkali metal nitrate, e) 0.05–0.2% by weight of benzotriazole or tolutriazole, f) 0.5–2% by weight of borax, g) 0.05–1% by weight of NaOH, h) 0.01–0.15% by weight of an oligo- or polycarboxylic acid having a molecular weight of 1000 to 100,000, all the percentages being based on the glycol present in the antifreeze mixture.

Antifreeze mixture for the purposes of the present invention is in general the glycol-based silicate-containing formulation prior to mixing with water.

The alkali metal salt of a $C_4$–$C_{16}$-alkenylsuccinic acid to be used according to the present invention is obtained in a conventional manner, for example by reacting in a first stage maleic anhydride with an alkene of from 4 to 16 carbon atoms, for example at from 120° to 250° C. and from 1 to 20 bar, and, after the reaction has ended, separating off the unconverted starting materials, advantageously by distillation. The alkenylsuccinic anhydride formed is then converted by reaction with a basic alkali metal compound, for example a hydroxyl, carbonate, or alcoholate, into an alkali metal salt. Suitable alkenes of from 4 to 16 carbon atoms for the reaction with maleic anhydride are for example 1-butene, isobutene, 2-butene, 1-pentene, 2-methyl-1-butene, 1-hexene, 1-heptene, 1-octene and preferably the $C_6$-, $C_9$-, $C_{12}$- and $C_{15}$-alkenes obtainable by oligomerization of propylene and the $C_8$-, $C_{12}$- and $C_{16}$-alkenes obtainable by oligomerization of $C_4$-alkenes, such as 1-butene or isobutene, of which the $C_8$-, $C_9$- and $C_{12}$-alkenes are preferred.

Suitable alkali metal salts of $C_4$–$C_{16}$-alkenylsuccinic acids are the lithium, sodium, potassium, rubidium and cesium salts, of which potassium, in particular the sodium salts, are preferred.

Suitable silicates of the general formula II are in particular the silicates described in DE-Al-3,440,194, which is why this publication and its contents are hereby incorporated herein by reference. A suitable alkali metal M is in particular potassium and especially sodium.

These silicates are obtained in a conventional manner as described for example by J. S. Falcone Jr. in Kirk Othmer's Encyclopedia of Chemical Technology, 3rd edition, volume 20, page 864, which is hereby incorporated herein by reference.

Suitable silicate stabilizers (c) are any desired effective compounds, for example stabilizers as described in DE-A-2,912,430 or EP 0,061,694. Preferred stabilizers are phosphorus silicon compounds as described in DE-Al3,440,194. These compounds react with the silicates of the formula II to form organosilane-silicate copolymers.

Suitable organic phosphorus silicon compounds are in particular those of the general formula IV

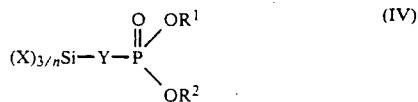

where
Y is a divalent aliphatic or cycloaliphatic radical of from 1 to 10 carbon atoms or a phenylenealkylene group of from 7 to 10 carbon atoms and
n is 1 or 2, if the former, i.e. if n=1, X being an $OR^3$ group where $R^3$ is straight-chain, branched or cyclic alkyl of from 1 to 13 carbon atoms which may be interrupted by oxygen atoms or acyl of up to 9 carbon atoms, and $R^1$ and $R^2$, which are identical or different, each being a straight-chain or branched or cyclic alkyl of from 1 to 13 carbon atoms which may be interrupted by oxygen, or aryl or aralkyl of up to 20 carbon atoms, or if the latter, i.e. if n=2, X being oxygen, $R^1$ being an alkali metal and $R^2$ being as defined above.

The organic phosphorus silicon compounds of the abovementioned formula IV (for example with n=1) can be prepared by known methods:

a) addition of dialkyl phosphites on alkenyltrialkoxysilanes in the presence of free radical formers or b) reaction of di- or trialkyl phosphites with haloalkyltrialkoxysilanes.

Some representatives of this class of compounds are known and described for example in J. Org. Chem. 25 (1960), 1191, DE-A2-2,219,983 and DE-A2-2,304,544 (method a)) and also in U.S. Pat No. 3,780,127 and U.S. Pat No. 3,816,550 (method b)). Further compounds may also be found in Organosilicon Derivatives of Phosphorus and Sulfur by S. N. Borisov, M. G. Voronkov and E. Y. Lukavits, Plenum Press, New York-London 1971, pages 94 et seq.

The radical Y in the abovementioned formula IV is as stated above a divalent aliphatic or cycloaliphatic radical of from 1 to 10 carbon atoms or a phenylenealkylene of from 7 to 10 carbon atoms.

Divalent aliphatic radicals are straight-chain or branched alkylene or alkenylene groups, e.g. methylene, ethylene, propylene, butylene, hexylene, methylpropylene, butenylene or hexenylene.

A cycloaliphatic radical is for example ethylenecyclohexylene or propylenecyclohexylene.

Phenylalkylene groups are for example phenylenemethylene and phenyleneethylene.

Y is preferably straight-chain or branched alkylene of from 1 to 6 carbon atoms, of which ethylene, propylene, butylene and isobutylene are particularly preferred.

$R^3$ in the formula IV (n=1) is preferably alkyl of from 1 to 4 carbon atoms.

$R^1$ and $R^2$ in the formula IV (n=1) are each preferably likewise alkyl of from 1 to 4 carbon atoms.

When n is 2, $R^1$ is preferably sodium or potassium.

The organic phosphorus silicon compounds of the formula IV where n=2 are obtained via the above-described phosphorus silicon compounds of the formula IV where n is 1 which have the structure element $(R^3O)_3Si-$. They are obtained by reaction in aqueous alkali metal hydroxide solution at from 70° to 100° C. over a period of from 10 to 20 hours. These compounds are phosphonoalkylsiloxanes.

The organosilane-silicate copolymers formed by reaction of the organic phosphorus silicon compounds with silicates can be prepared either in situ in the course of the preparation of the antifreeze formulation by reaction of the alkali metal silicate present therein with the organic phosphorus silicon compound of the formula IV in a weight ratio of from. 1:1 to 10:1, preferably from 2:1 to 8:1, or be prepared separately in advance.

In this case, the alkali metal silicate is admixed with the organic phosphorus silicon compound of the formula IV in an appropriate amount and stirred at from 30° to 150° C., preferably at from 30° to 80° C., in glycol or water or else in a glycol-water mixture over a period of from 5 to 10 hours. The resulting organosilanesilicate copolymer, whose silicate content is within the range from about 50 to 90% by weight, preferably from 65 to 90% by weight, each percentage being based on the total amount of the two reactants, can then be added to the antifreeze mixture which contains the other components.

This antifreeze mixture may contain further conventional corrosion inhibitors, for example borates, nitrates, benzoates, benzotriazole or tolutriazole, and also anti-foams or other additives (cf. Ullmann, loc. cit.).

Suitable oligo- or polycarboxylic acids which are added to the antifreeze mixture in amounts of from 0.01 to 0.15% by weight, preferably from 0.05 to 0.1% by weight, based on the glycol present in the antifreeze mixture, are for example polyacrylic acid, oligomaleic acid, and maleic acid/acrylic acid copolymers. The oligoor polycarboxylic acid has a molecular weight of from 1000 to 100,000, preferably from 2000 to 10,000.

To prepare the cooling medium, the antifreeze mixture according to the present invention is admixed with water to prepare an aqueous solution advantageously from 20 to 50% strength by volume.

The antifreeze mixture according to the invention substantially prevents corrosion of aluminum and is notable not only in the undiluted state but also in aqueous solution for advantageous silicate stability.

The Examples which follow will illustrate the invention in more detail.

EXAMPLE 1

896 g of diisobutene, which consists mainly of the following two isomers:

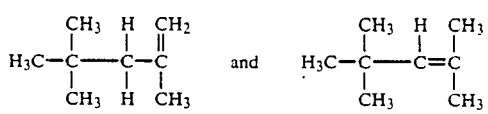

and 392 g of maleic anhydride are stirred at 190° C. for 4 hours. Unconverted starting materials are distilled off. The reaction product (chiefly octenylsuccinic anhydride) is likewise distilled off. Yield: 82% of theory. It is subsequently converted with aqueous sodium hydroxide solution into the disodium salt.

EXAMPLES 2 TO 5

Example 1 is repeated, except that the diisobutene is replaced by one of the alkenes indicated in the Table below, affording the disodium salts of the alkenylsuccinic acid indicated in the last column of the Table below:

| | Alkene used | Disodium salt of |
|---|---|---|
| Example 2 | isobutene | $C_4$-alkenylsuccinic acid |
| Example 3 | triisobutene | $C_{12}$-alkenylsuccinic acid |
| Example 4 | tripropylene | $C_9$-alkenylsuccinic acid |
| Example 5 | tri-n-butene | $C_{12}$-alkenylsuccinic acid |

EXAMPLE 6

A mixture is prepared from 2.10% of the disodium salt of octenylsuccinic acid as per Example 1

0.15% of $Na_2SiO_3.5H_2O$ 0.026% of

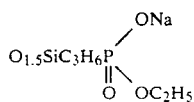

0.10% of tolutriazole 0.155% of NaOH 50% strength 0.25% of $NaNO_3$ 0.075% of polyacrylic acid (molecular weight 4000)
remainder monoethylene glycol.

EXAMPLES 7 TO 10

Example 6 is repeated, except that the disodium salt of octenylsuccinic acid as per Example 1 is replaced by the disodium salt of the alkenylsuccinic acid indicated in the last column of the Table below:

| Example | Disodium salt of |
|---|---|
| 7 | $C_4$-alkenylsuccinic acid as per Example 2 |
| 8 | $C_{12}$-alkenylsuccinic acid as per Example 3 |
| 9 | $C_9$-alkenylsuccinic acid as per Example 4 |
| 10 | $C_{12}$-alkenylsuccinic acid as per Example 5 |

APPLICATION TEST

The following formulations were subjected to ASTM test 1384 (glassware test):

A = 25% strength by volume aqueous solution of the mixture of Example 6

B = 25% strength by volume aqueous solution of the mixture of Example 7

C = 25% strength by volume aqueous solution of the mixture of Example 8

D = 25% strength by volume aqueous solution of the mixture of Example 9

E = 25% strength by volume aqueous solution of the mixture of Example 10

Table 1 indicates the measured weight increases or decreases (in g/m²) obtained in ASTM 1384.

TABLE 1

| | Test A | Test B | Test C | Test D | Test E |
|---|---|---|---|---|---|
| Copper | −0.02 | 0.02 | −0.03 | −0.02 | −0.05 |
| Solder | −0.03 | 0.00 | −0.04 | −0.02 | 0.00 |
| Brass | −0.07 | 0.04 | −0.07 | −0.01 | −0.01 |
| Steel | −0.01 | −0.02 | −0.01 | −0.01 | 0.00 |
| Gray cast iron | 0.00 | −1.70 | −0.01 | −0.01 | −0.02 |
| Cast aluminum | −0.08 | −0.39 | −0.07 | −0.03 | −0.05 |

Table 1 reveals that the formulations according to the invention offer excellent protection not only of gray cast iron but also of cast aluminum.

We claim:

1. An antifreeze mixture for internal combustion engines based on ethylene glycol and/or propylene glycol which is free of nitrite and phosphate, consisting essentially of
   a) 1–5% by weight of an alkali metal salt of a $C_4$–$C_{16}$-alkenylsuccinic acid,
   b) 0.1–1% by weight of silicate of the formula II $$(MO)_q SiO_{4-q/2} \quad (II)$$

where
M is an alkali metal and
q is from 0.4 to 4,
   c) 0.01–0.2% by weight of a silicate stabilizer,
   d) 0–0.5% by weight of an alkali metal nitrate,
   e) 0.05–2.0% by weight of benzotriazole or tolutriazole,
   f) 0.5–2% by weight of borax,
   g) 0.05–1% by weight of NaOH,
   h) 0.01–0.15% by weight of an oligo- or polycarboxylic acid having a molecular weight of 1000 to 100,000, and
   i) ethylene glycol and/or propylene glycol.

all the percentages being based on the amount of ethylene glycol and/or propylene glycol present in the antifreeze mixture.

2. The antifreeze mixture of claim 1, wherein component (a) is the sodium salt of a $C_8$-, $C_9$- or $C_{12}$-alkenylsuccinic acid or a mixture thereof.

3. The antifreeze mixture of claim 1, wherein component (c) is a silicate stabilizer of the formula

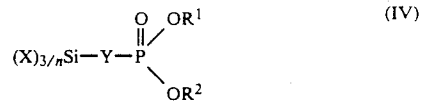

where
Y is a divalent aliphatic or cycloaliphatic radical of from 1 to 10 carbon atoms or a phenylenealkylene group of from 7 to 10 carbon atoms and
n is 1 or 2, wherein, when n = 1, X is an $OR^3$ group where $R^3$ is straight-chain, branched or cyclic alkyl of from 1 to 13 carbon atoms which may be interrupted by oxygen atoms or acyl of up to 9 carbon atoms, and $R^1$ and $R^2$, which are identical or different, are each a straight-chain or branched or cyclic alkyl of from 1 to 13 carbon atoms which may be interrupted by oxygen, or aryl or aralkyl of up to 20 carbon atoms, and when n = 2, X is oxygen, $R^1$ is an alkali metal and $R^2$ is as defined above.